(12) United States Patent
Price

(10) Patent No.: US 10,717,127 B2
(45) Date of Patent: Jul. 21, 2020

(54) SELF-BONDING REFRACTORIES FOR INVESTMENT CASTING SLURRIES AND MOLDS DERIVED THEREFROM

(71) Applicant: IC Ceramic Consulting, LLC, Weare, NH (US)

(72) Inventor: David B. Price, Weare, NH (US)

(73) Assignee: IC Ceramic Consulting, LLC, Weare, NH (US)

( * ) Notice: Subject to any disclaimer, the term of this patent is extended or adjusted under 35 U.S.C. 154(b) by 366 days.

(21) Appl. No.: 15/795,557

(22) Filed: Oct. 27, 2017

(65) Prior Publication Data

US 2018/0117668 A1    May 3, 2018

Related U.S. Application Data

(60) Provisional application No. 62/414,437, filed on Oct. 28, 2016.

(51) Int. Cl.
| | | |
|---|---|---|
| *B22C 9/04* | (2006.01) | |
| *C04B 28/02* | (2006.01) | |
| *C04B 14/30* | (2006.01) | |
| *C04B 16/04* | (2006.01) | |
| *B22C 7/02* | (2006.01) | |
| *C04B 18/14* | (2006.01) | |
| *C04B 26/28* | (2006.01) | |
| *C04B 111/00* | (2006.01) | |

(52) U.S. Cl.
CPC ............... *B22C 9/043* (2013.01); *B22C 7/02* (2013.01); *C04B 14/303* (2013.01); *C04B 14/305* (2013.01); *C04B 16/04* (2013.01); *C04B 18/146* (2013.01); *C04B 26/285* (2013.01); *C04B 28/02* (2013.01); *C04B 2111/0087* (2013.01); *C04B 2111/00431* (2013.01); *C04B 2111/00939* (2013.01)

(58) Field of Classification Search
CPC .... B22C 3/00; B22C 1/00; B22C 1/02; B22C 1/08; B22C 1/14; B22C 9/043
See application file for complete search history.

(56) References Cited

U.S. PATENT DOCUMENTS

| | | | |
|---|---|---|---|
| 4,019,558 A * | 4/1977 | Szabo | B22C 1/165 164/516 |
| 4,508,835 A | 4/1985 | Kaniuk et al. | |
| 5,465,780 A * | 11/1995 | Muntner | B22C 9/04 164/516 |
| 6,949,136 B2 * | 9/2005 | Horton | B22C 1/185 106/38.2 |

(Continued)

*Primary Examiner* — Kevin P Kerns
*Assistant Examiner* — Steven S Ha
(74) *Attorney, Agent, or Firm* — Maine Cernota & Rardin

(57) ABSTRACT

A self-bonding refractory powder product for use in making a slurry for investment casting molds comprising a coarse refractory powder; a Nano-sized powder; and an organic polymer powder, wherein it does not require aqueous colloidal silica to produce slurries used to build investment casting molds. The Nano-sized powder comprises fumed alumina, boehmite, fumed silica, or fumed titanium oxide or combinations thereof. The coarse refractory powder comprises milled zircon, tabular alumina or fused alumina, fused silica, alumino-silicate, zirconia, and yttria or combinations thereof. The organic polymer powder comprises a cellulose-based material.

15 Claims, 10 Drawing Sheets

PROCEDURES COMPARISON

(56) References Cited

U.S. PATENT DOCUMENTS

| | | | |
|---|---|---|---|
| 9,227,241 B2 | 1/2016 | Bhattacharja | |
| 2011/0114279 A1* | 5/2011 | Scott | B22C 7/02 |
| | | | 164/24 |
| 2012/0111224 A1* | 5/2012 | Tontrup | B22C 9/00 |
| | | | 106/15.05 |
| 2015/0158076 A1* | 6/2015 | Bochiechio | B22C 3/00 |
| | | | 164/72 |

* cited by examiner

PROCEDURES COMPARISON

ESSENTIAL SHELL BUILD OPERATIONS

300

PATTERN AND WAX ASSEMBLY

400

| | Prime Slurry | | Backup Slurry | |
|---|---|---|---|---|
| Raw Mat. | With Colloidal Silica, wt. % | Self-bonded refractory, wt. % | With Colloidal Silica, wt. % | Self-bonded refractory, wt. % |
| Colloidal silica | 22.9% | | 30.2% | |
| Boehmite | | 3.7% | | 5.1% |
| 200M fused silica | 12.0% | 12.2% | | |
| 120M fused silica | | | 15.9 | 14.4% |
| -325 tabular alumina | 60.2% | 61.2% | | |
| 200M Mulgrain 60 | | | 47.7% | 43.1% |
| Fumed silica | | 1.2% | | 1.7% |
| Fumed Titania | | 0.05% | | 0.07% |
| METHOCEL ® methylcellulose | 0.14% | 0.26% | 0.18% | 0.55% |
| Deionized water | 4.8% | 21.4% | 6.0% | 35.1% |

SLURRY FORMULATION COMPARISON DISTINCTIONS

17, SELF-BONDED BACK-UP WITH COLLOIDAL SILICA BONDED PRIME

20, SELF-BONDED PRIME WITH COLLOIDAL SILICA BONDED BACK-UP.

FLASH-FIRED DEWAXED AND FIRED MOLDS

600

620 With self-bonded prime, and colloidal silica bonded backup

640 With colloidal silica bonded prime and backup

SHELL HARDER TO REMOVE FROM DEEP DETAIL

A356 ALLOY, FROM SELF-BONDED

CASTING FROM COLLOIDAL SILICA BONDED PRIME

CASTINGS

700

AL/SI DISTINCTIONS BETWEEN EMBODIMENTS OF THE INVENTION AND OTHER METHODS

800
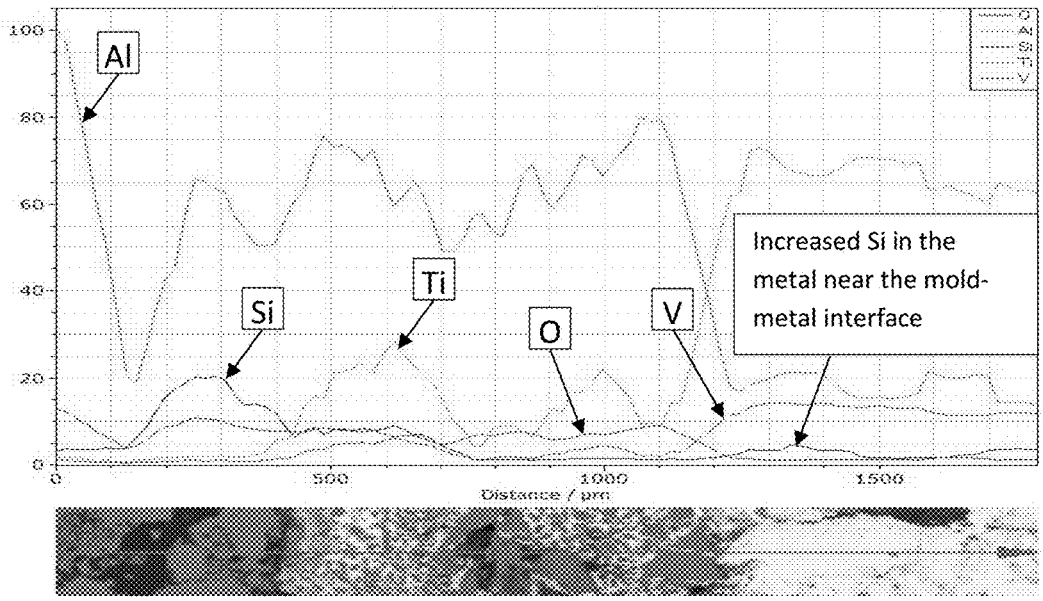
820   ALL COLLOIDAL SILICA BONDED
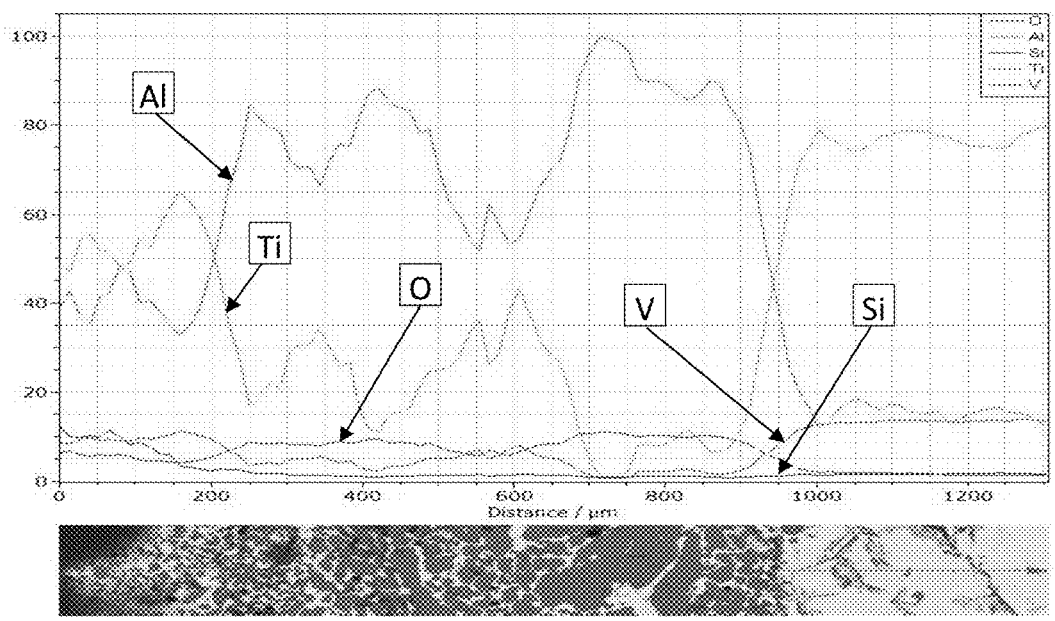
840   ALL SELF-BONDED REFRACTORY
SEM/EDS OF TABULAR ALUMINA SELF-BONDED REFRACTORY IN CONTACT WITH TI 6AL 4V.
FIG. 8

METHOD

1000
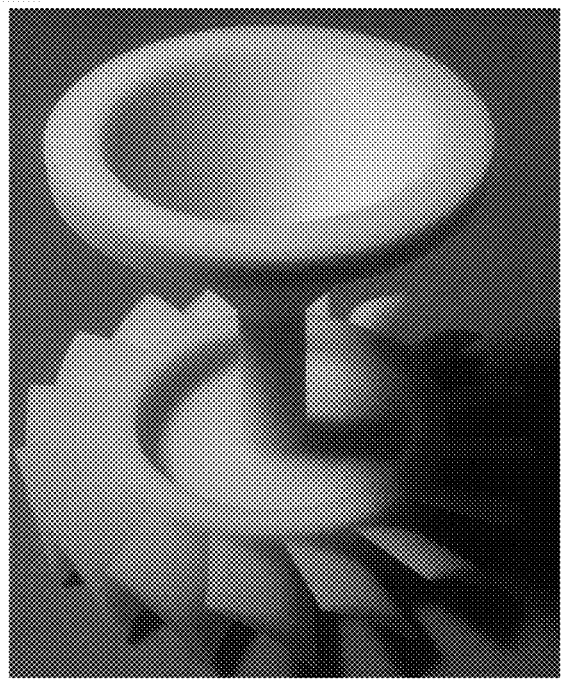
1020 PATTERN
1040 WITH HARDENED MOLD MATERIAL
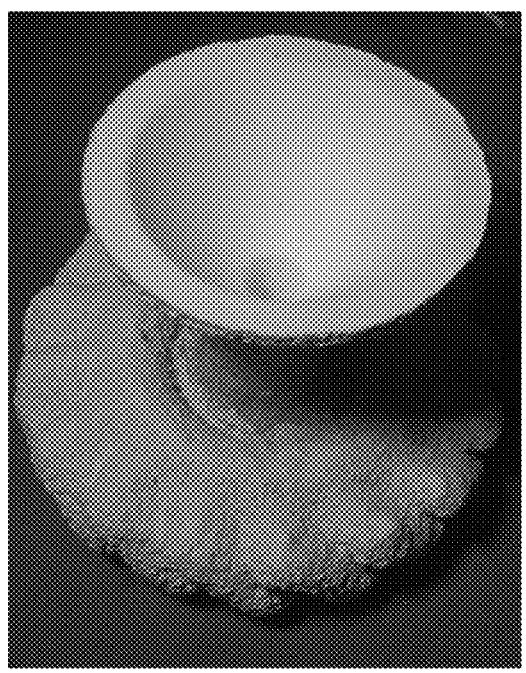
1060 FIRED MOLD
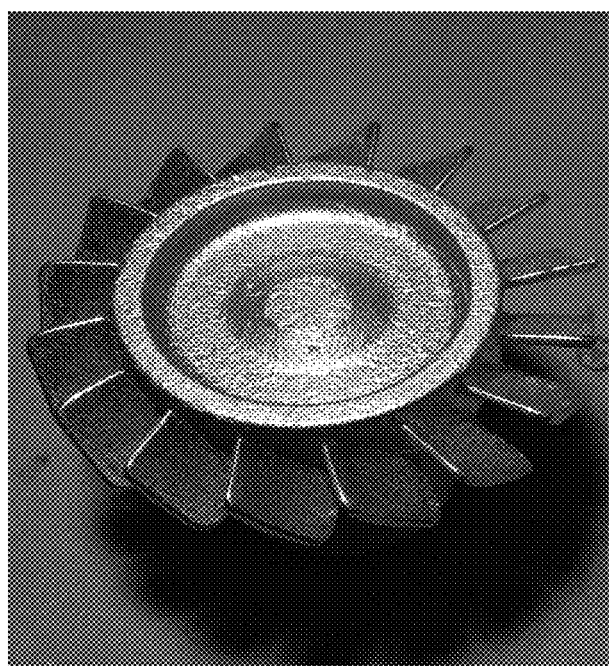
1080 CASTING WITH MOLD REMOVED
FIG. 10

SELF-BONDING REFRACTORIES FOR INVESTMENT CASTING SLURRIES AND MOLDS DERIVED THEREFROM

RELATED APPLICATIONS

This application claims the benefit of U.S. Provisional Application No. 62/414,437 filed Oct. 28, 2016.

FIELD OF THE DISCLOSURE

Embodiments relate to the field of investment casting, and more particularly, to self-bonding refractory powders for investment casting slurries and a process for producing a casting mold, and also a casting mold which can be obtained by this process.

BACKGROUND

Investment casting is a type of precision casting for metals, also known as the lost wax process. A pattern model identical to the desired workpiece to be produced is initially made from wax or other materials. Multiple patterns produced by wax injection may be joined to other wax pieces to create a so called "wax assembly". The "wax assembly" goes through a sequence of shell-build operations to encase the pattern in mold material. Molten metal is then poured into the fired and pre-heated mold to produce the rough casting of the desired work-piece. Tight dimensional control throughout the process is essential to yield a so called 'near-net-shape' casting requiring minimal machining.

Typically, the shell-build process requires two types of slurry so called "prime" and "backup". The prime slurry, used for the first, and/or second coats, consists of finer particle-size refractory powder, typically −325 mesh refractory powder, and aqueous colloidal sol with organic polymer. Prime slurries have high solids content and need to have rheological characteristics to produce a uniform coating to replicate all of the pattern detail in the mold and casting. Typically, the "prime slurry" contains surfactants to allow wetting of the slurry on the pattern and antifoam emulsion to reduce surface tension and minimize entrapped air and facilitate efficient mixing of the slurry raw materials. The "backup" slurry consists of coarser powder, typically −200 and or −120 mesh refractory powder, aqueous colloidal sol with organic polymer at lower solids content and is used for all coats except the first or second coats. After each slurry and stucco combination (referred to as a coating) is applied, a drying operation is performed in a temperature and humidity controlled environment to prepare for the next coating until all coats are applied. Use of organic polymer in slurries, introduced to the investment casting industry in the mid 1980's, provides essential plasticity and toughness to the coatings during the drying and "dewax" operations. Prior to the use of polymer, colloidal silica alone (which forms a water insoluble bond), provided the strength throughout all the shell-build operations; dipping, drying, "dewax", firing, and casting. Historically, colloidal silica has played a key role for producing ceramic shell molds in the investment casting industry.

The so called "dewax" operation is performed by steam autoclave or flash-fire to remove the wax and pattern material. Flash-fire, introduced in the 1990's by Pacific Kiln, performs both dewax and mold firing simultaneously. The resultant mold from either method must yield a clean mold cavity free of all residue with a smooth hard surface. Firing is typically performed in the 1,800 to 2,000 deg F. range. After preheating of the mold molten metal is then poured into the mold cavity and solidified. Finally, the raw casting is obtained by removal of the ceramic mold material. Shell removal can be accomplished by impacting the cast runners with a hammer or by waterblast.

Known methods for slurry formulation use colloidal silica (a stable dispersion of silicon oxide particles), alumina, zirconia or yttria sol with particles less than 300 nm in size in a continuous aqueous medium. Aqueous colloidal silica, nominally 30% solid and balance water, is used in a variety of grades; small particle, large particle, and polymer enhanced. Colloidal silica has been the preferred binder for precision investment casting since ethyl silicate was phased out in the 1980's. Colloidal silica does have some favorable characteristics. Colloidal silica forms a permanent bond to itself that is ideal for dipping, drying, steam autoclave, and strength at high temperatures. Colloidal silica particles sinter and bind the refractory particles together. This provides the needed mechanical strength for dipping, drying, dewax, and casting operations. As a result, colloidal silica is the binder of choice in the majority of precision investment casting foundries.

However, aerospace manufacturers are designing more and more components based on light weight and reactive alloys. Casting manufacturers need better mold materials that are less reactive to cast alloys like titanium aluminide and the expanding demand for single-crystal components. Therefore, the ability to make molds that have reduced silica, or silica-free and less reactive, can be fired to higher temperatures (1900 to 2,200 deg. F.) are very desirable characteristics that colloidal silica bonded molds have a hard time delivering. Demands dictated by advanced alloys include: higher mold firing temperatures, thermal conditions in casting, and the availability of silica-free binders. For example, jet engine turbine blades rotating at up to 5,000 rpm at 1,000 degrees C. for up to 15 hours must perform flawlessly.

Silica-free mold face-coats would also be a huge benefit for casting titanium alloys. It is common knowledge that silica binder causes a reaction with elements like titanium, hafnium, yttrium, and aluminum that can lead to oxide inclusions or a case-hardened surface.

$$Ti_{(liq.)} + SiO_{2(solid)} \rightarrow TiO_{2(solid)} + Si$$

The 'case', hardened and brittle surface layer, developed during casting must be removed by a special high-temperature chemical soaking operation. Additionally, oxide inclusions can become flaws that initiate premature failure. So, manufacturer suppliers of components realize customer tolerance for imperfections in aerospace industries is basically non-existent. For this reason, precision investment casting processes need the highest quality raw materials to produce flawless products.

While molds made from colloidal-silica-bonded slurry can produce quality cast articles, there are many drawbacks and consequences. Initially, bulky transport is required for the liquid. The environment must be controlled to prevent freezing and degradation. The stability of colloidal silica has many factors including pH, particle size, silica concentration, and storage temperature. Sols should be stored at 5-35° C. (40-95° F.). If the sol is subjected to freezing conditions, it can lose its stability and precipitate. Highly elevated temperatures may accelerate the growth of micro-organisms and/or decrease the long-term stability of the silica sol. pH ranges are very important to the stability of the sol. For example, if the pH of the "prime" slurry approaches 9.2, the binder starts to gel and should not be used in that state to manufacture molds. "Ostwald ripening" leads to agglomeration of the very small silica particle dispersions and the surface area will slowly decrease. The latter results in a critical reduction in strength of colloidal silica bonded molds. That is why companies have dedicated laboratories and technicians to regularly confirm the quality of the colloidal silica binder in the production slurries. Silica concentration is also very important for stability. The more concentrated a sol, the more likely the particles will be forced together and allowed to aggregate. Stability generally determines the shelf life of a sol. Checking sol stability involves performing an 'oven gel test' which requires 24 hours to perform. Either production has to be suspended during that period, or production continues under a cloud of suspicion. As evidenced above, even with transportation and storage capabilities, shelf life monitoring, the gelling of the binder creates an atmosphere of doubt and risk associated with colloidal silica-bonded molds used to produce precision castings. Furthermore, even if skilled technicians determine the binder in a slurry has gelled it is unknown how much product is at risk because of the 24-hour period needed to test the binder by the 'oven gel test'.

Furthermore, the use of mild steel or iron with colloidal silica is discouraged because the iron will discolor the product and destabilize the dispersion. Lastly, cleaning colloidal silica can involve using a caustic soda solution of 4-5% caustic soda (NaOH), agitating for 2-5 hours at 50-60° C.

Regarding alternatives to molds produced with silica sols it is common knowledge that non-silica sol bonded molds must be dewaxed by flash-firing as they break down in a steam autoclave dewax. Colloidal zirconia, yttria, and alumina are common presently commercially available options for low reactive prime coats. Since those products are nearly 100% of those oxides they require very high temperatures to develop sinter-bonding with those products. So, if the backup slurries are silica-bonded they would be over-fired if the mold was fired at 2100 F to develop the needed sintering that the non-silica sols require. Furthermore, when producing large molds with silica sols, the maximum firing temperature may need to be limited to prevent mold distortion associated with softening of the colloidal silica.

Presently aqueous colloidal silica is used in some way throughout the investment casting industry. Furthermore, transport of colloidal silica must be done under temperature controlled conditions and during winter months stored in a heated warehouse. A way to produce investment casting molds without transporting water and storing water would significantly reduce the energy and cost associated with colloidal silica or any aqueous oxide sol binder for that matter. Furthermore, in the aerospace investment casting sector, such as single crystal casting operations, the use of colloidal silica has limitations; 1) molds produced with colloidal silica, fired to high temperature, are frequently too strong leading to defects and special shell removal operations, and 2) The use of desired elements such as yttrium, titanium, hafnium, and aluminum is limited due to reaction with colloidal silica. So, reduced silica or silica-free binder is a significant advantage in the aerospace investment casting sector. Therefore, producing molds that are simultaneously less reactive and easier to remove has significant advantage.

The reference "Effect of Mold Material and Binder on Metal-Mold Interfacial Reaction for Investment Casting of Titanium Alloys by Kim, teaches the negative effects of using colloidal silica binders for titanium. Kim clearly shows increased reaction and increased hardness by reaction with the silica from colloidal binders.

What is needed is a dry, reduced silica, powder material which, when combined with water instead of aqueous colloidal silica sol, forms a refractory investment slurry that produces molds for castings having accurate dimensions, that avoid cracks and settling away, and maintains structural integrity during steam autoclave dewax, while reducing transportation, storage, and preparation costs associated with aqueous colloidal silica binder. The dry powder, and slurries produced therefrom, needs to fit within the present operations and processes without causing major disruption that would result in inconvenience and major equipment changes by precision casting manufacturers.

SUMMARY

An embodiment provides a self-bonding refractory powder product for use in making a slurry for investment casting molds comprising a coarse refractory powder; a Nano-sized powder; and an organic polymer powder. In embodiments the coarse refractory powder comprises aluminum oxide, zircon, mullite, alumino-silicate, zirconium oxide, yttrium oxide, fused silicon oxide, and combinations thereof. In other embodiments, the Nano-sized powder comprises boehmite or pseudo boehmite, aluminum oxide, silicon oxide, or titanium oxide, and combinations thereof. In subsequent embodiments the organic polymer powder comprises at least one of a cellulose-based material and a cellulose-based material combined with polyethylene glycol. For additional embodiments the sizes of particles of the coarse refractory powder are −325 mesh, −200 mesh, and −120 mesh and combinations thereof. In another embodiment, the Nano-sized powder component comprises particles less than about 300 nanometers. For a following embodiment the self-bonding refractory powder, when dispersed in deionized water, and buffered to between 3.0 and 5.0 pH, produces a slurry to produce investment casting molds. In subsequent embodiments the self-bonding refractory powder, once used to produce molds, yields molds that can be dewaxed by flash-fire or steam autoclave. In additional embodiments the self-bonding refractory powder does not comprise aqueous colloidal silica to produce slurries used to build investment casting molds.

Another embodiment provides a method for producing an investment casting comprising obtaining a dry powder (905); obtaining water (910) and buffering the water; combining the dry powder and the buffered water to form a slurry or sol only (915); adjusting a pH of the slurry (920); providing a pattern (930); applying the slurry with a stucco to the pattern to create a mold (935); allowing the mold to harden (940); removing the pattern from the mold (945); filling the mold with molten casting material (950); allowing the casting material to solidify (955); and removing the mold from a cast article (960). Included embodiments provide an investment casting mold obtained in a process comprising the powder refractory product and the method above. In yet further embodiments the dry powder (505) comprises fumed alumina, boehmite, fumed silica, or fumed titanium oxide or combinations thereof; and aluminum oxide, zircon, mullite, alumino-silicate, zirconium oxide, yttrium oxide, silicon oxide, and combinations thereof; and a cellulose-based material. In related embodiments the step of obtaining water (910) and buffering the water comprises adding nitric acid to a pH between about 3.0 and about 5.0. For further embodiments the step of adjusting pH of the slurry (920) comprises a slurry pH range of about 3.5 to about 5.0 (920). Ensuing embodiments further comprise a step of storing the stable slurry (925). For yet further embodiments, the step of storing the stable slurry (925) comprises a viscosity in a range of 8 to 25 seconds measured with a #4 Zahn Cup. For more embodiments, the step of removing the pattern from the mold comprises flash-fire or steam autoclave (945). In continued embodiments the cellulose-based material comprises a methocel cellulose binder. Additional embodiments comprise a Nano-sized powder comprising boehmite or pseudo boehmite, aluminum oxide, silicon oxide, or titanium oxide, and combinations thereof; an organic polymer powder; and a coarse refractory powder comprising aluminum oxide, zircon, mullite, alumino-silicate, zirconium oxide, yttrium oxide, fused silicon oxide, and combinations thereof.

A yet further embodiment provides a method for producing an investment casting comprising obtaining a dry powder (905) comprising fumed alumina, boehmite, fumed silica, or fumed titanium oxide or combinations thereof, and aluminum oxide, zircon, mullite, alumino-silicate, zirconium oxide, yttrium oxide, silicon oxide, and combinations thereof, and a methylcellulose cellulose-based material; obtaining (deionized) water (910) and buffering the deionized water with nitric acid to a pH between about 3.0 and about 5.0; combining the dry powder and the buffered water to form a slurry (915); adjusting pH of the slurry as-needed to an about 3.5 to about 5.0 range (920); optionally storing the stable slurry (925) with viscosity in the range of 8 to 25 seconds measured with a #4 Zahn Cup; providing a pattern (930); applying the slurry with a stucco to the pattern to create a mold (935); allowing the mold to harden (940); removing the pattern from the mold by flash-fire or steam autoclave (945); filling the mold with molten casting material (950); allowing the casting material to solidify (955); and removing the mold from a cast article (960); wherein cellulose polymer has a stress strain behavior like ductile metals comprising 5 to 15% elongation and a 174 deg. C. glass transition temperature.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention. For purposes of clarity, not every component may be labeled in every drawing.

FIG. 4 is a table comparing known colloidal silica slurry compositions with self-bonded refractory slurry compositions lacking colloidal silica in accordance with an embodiment.

FIG. 8 depicts chemistry differences for a titanium-based reactive alloy in contact with shell materials in accordance with an embodiment.

FIG. 10 depicts an example of pattern through casting in accordance with an embodiment supporting a method of FIG. 9.

Figure 1:
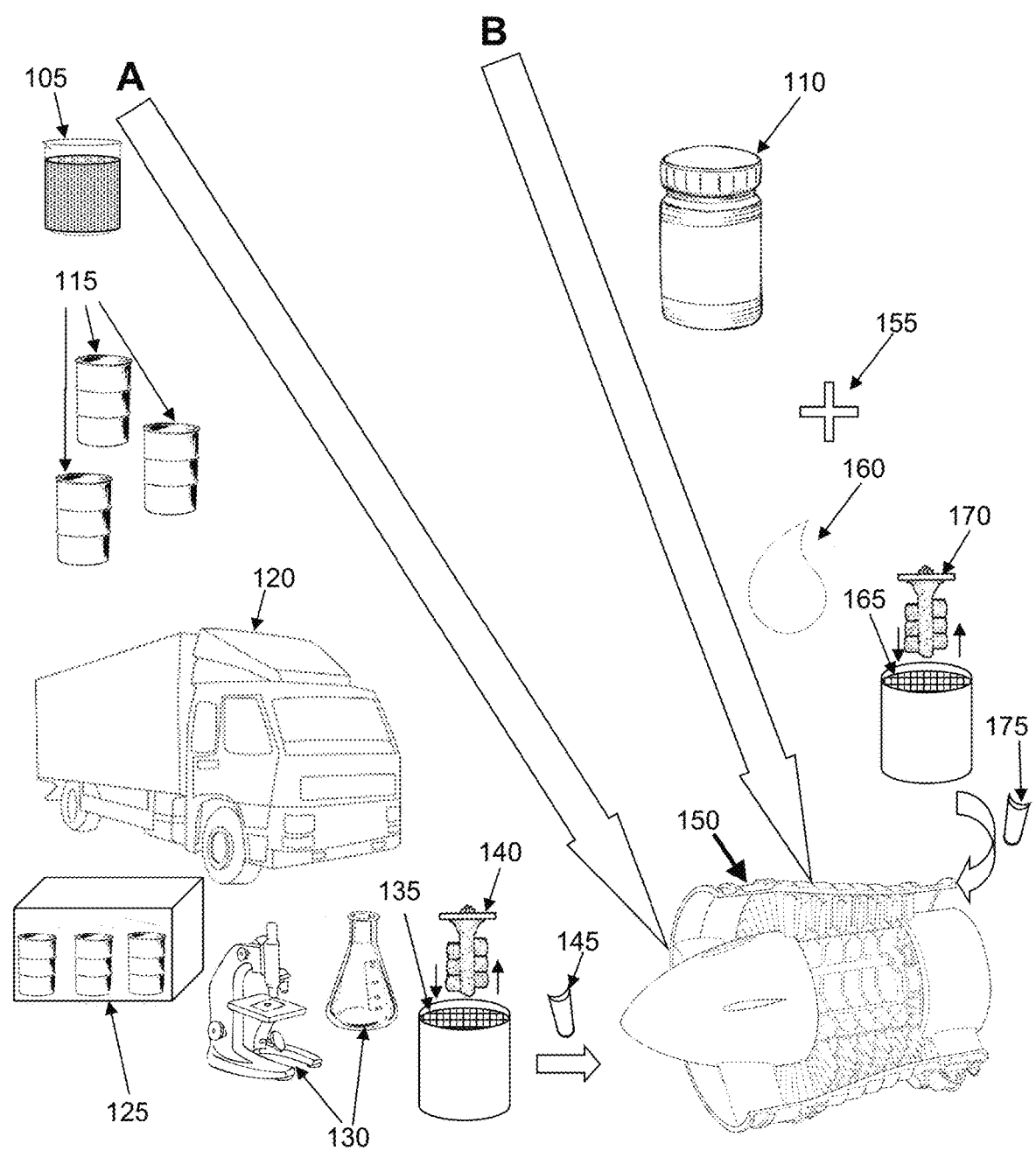
FIG. 1 illustrates procedures comparison distinctions between embodiments of the invention and other methods.

These and other features of the present embodiments will be understood better by reading the following detailed description, taken together with the figures herein described.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

Advantages of embodiments: 1) Cost savings for shipping; not shipping water, and no need for temperature control during shipping and storage as required for colloidal silica. 2) Simplicity of use by the end user, just add water, fewer materials to source and inventory. 3) Less reaction between the metal and mold surface, easing shell removal, and improving the surface finish of the casting. 4) The ability to employ both Nano-sized silica and aluminum oxides in "backup" slurries to improve high temperature dimensional stability of the mold and casting. 5) Self-bonded refractory can be used in both prime and backup slurry. 6) Higher firing temperatures can be employed since the composition of the self-bonded refractory is more stable than colloidal silica at high temperatures.

The paradigm within the investment casting industry is that organic polymer additives are used to reduce cracking during the drying process at 68 to 72 deg. F. The polymers are formulated to have a glass transition temperature below room temperature. The lower than room temperature glass transition temperature allows the polymer to plastically deform during the drying process instead of failing in brittle fracture. However, Methylcellulose has a glass transition temperature of about 174 deg. C. (345 deg. F.). In contrast, this explains why methylcellulose embodiments maintain their integrity during the dewax operations, both steam autoclave and flash-fire. Paraffin wax, melt temperature around 68 deg. C., a key ingredient in wax patterns, has softened and melted while the methylcellulose is still below its glass transition temperature. The strength of methylcellulose is a high-toughness strength, not brittle like the colloidal silica bond. The latter is very critical since self-bonded refractory uses very little to no colloidal silica.

Methylcellulose has a much lower Elastic Modulus, $21 \times 10^4$ psi/in/in compared to $11 \times 10^6$ psi/in/in for silica, so for the same strain there could be up to 50 times less stress in a methylcellulose bonded piece compared to an equivalent with a colloidal silica bond.

An embodiment used a self-bonded prime and backup coats, only a colloidal prewet between the 2nd and 3rd coats. A turbine wheel casting, FIG. 10, shows no evidence of dewax related defects such as fins from mold cracks and expansion of the pattern against the mold during dewax. This is in high contrast and a departure from the state-of-the-art. During steam autoclave dewax the state-of-the-art polymers (PVA-PEG) added for drying have softened and lost their integrity by virtue of the glass transition temperature below room temperature. Conversely, the colloidal silica is then relied upon for the strength and maintaining dimensional quality. Furthermore, colloidal silica forms a brittle bond so during steam autoclave or flash-fire stress-strain behavior is theoretically linear. Since the methylcellulose has a much higher glass transition temperature it will maintain its' strength and stiffness to a higher temperature and longer time into the dewax operation compared to PVA-PEG. Additionally, since the wax has a lower melting temperature, compared to the methylcellulose glass transition temperature, the methylcellulose maintains its' integrity while the wax melts. Furthermore, for embodiments, the methylcellulose, which provides all the bond strength in self-bonded refractory, behaves as a ductile solid above 345 deg. F. and colloidal silica is a brittle solid. Addition of Polyethylene glycol improves the plasticity of methylcellulose. For embodiments this decreases the Young's Modulus thereby increasing the toughness. Also, when methylcellulose is heated, it creates more bonds with adjacent polymers creating a more completely connected network.

Self-bonded refractory with high-alumina prime has a unique ability to increase in strength supported by 3-pt MOR testing. Methylcellulose will dissolve in water at room temperature, but it will gel and become a hard solid when heated. For embodiments, this unique behavior of methylcellulose contributes to the reason self-bonded refractory works compared to traditional polymers used today in the industry. Methylcellulose finally decomposes between 482 and 572 deg. F. according to https://cameochemicals.noaa-.gov/chemical/20633. The unique ability of methylcellulose to dissolve in cold water, get stronger upon heating, and a glass transition temperature of about 174 deg C. (345 deg. F.) help to explain why methylcellulose added to self-bonded refractory is a critical part of why self-bonded refractory works. Embodiments comprise a METHOCEL® cellulose binder; METHOCEL® is a registered trademark for methylated cellulose, including methylcellulose and mixed cellulose ethers having methyl groups by the Dow Chemical Company, a Delaware corporation.

In embodiments, the strength increase, 150 to 300 psi from 70 to 250 deg. F. is due to thermal expansion mismatch. In this case the prime coat is trying to expand when heated, but since the backup system has more mass, surrounds the prime coats, and has a lower CTE, the prime coats are restricted from expanding and a compressive stress is developed leading to the increased MOR strength. Embodiments also have very good results when the above strengthening is absent, i.e. limited CTE mismatch of Prime and Backup coats.

For embodiments, the low viscosity grade, A15LV, and the amount is a key factor in self-bonded refractory. The solids content of the slurry can be high, and slurry viscosity low. The sol in the slurry is also able to be fluid enough at high solids content in itself. With the A15LV, it is possible to put the most methylcellulose in the slurry thereby getting the highest unfired strength possible, in the 'hardened' unfired state, going into the dewax operation.

Figure 2:
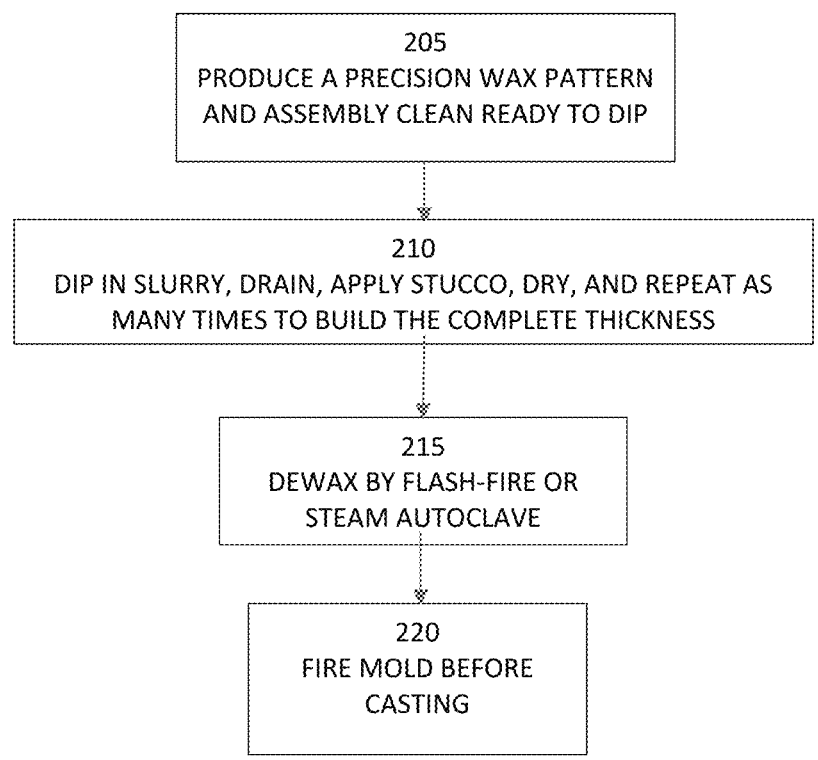
FIG. 2 is a flow chart depicting essential shell-build operations.

FIG. 1 illustrates procedures comparison distinctions 100 between embodiments of the invention and other methods. Path A depicts standard methods using aqueous colloidal silica sol 105. Path B uses dry powder 110. Path A incorporating aqueous colloidal silica sol requires large volumes of liquid aqueous colloidal silica sol 105, typically transported in barrels 115. These bulky containers impose significant shipping requirements 120. Furthermore, once at the foundry destination, involved temperature-controlled storage 125 and chemical analysis procedures 130 are required to ensure the suitability of the slurry 135 for mold manufacture 140. As mentioned, it is extremely important that cast components 145 are near-perfect, especially for applications such as turbine blades for a jet engine 150. Once a slurry has been produced, by Path A or Path B, the shell build process, depicted in FIG. 2, is the same. Returning to Path B, embodiments of the invention use only dry powder 110 to provide all major constituents, requiring no aqueous colloidal silica sol for slurry formulation. In production, dry powder 110 is added 155 to deionized water buffered to pH 3 to 5 160 to produce slurry 165. Mold 170 and cast components 175 perform at least as well as those derived from aqueous colloidal silica sol approaches.

FIG. 2 is a flow chart of shell build operations 200. Steps comprise producing a precision wax pattern and assembly, clean and ready to dip 205; dipping in slurry, draining, applying stucco, drying, and repeating as many times as needed to build the complete thickness 210; dewaxing by flash-fire or steam autoclave 215; and firing mold before casting 220.

Figure 3:
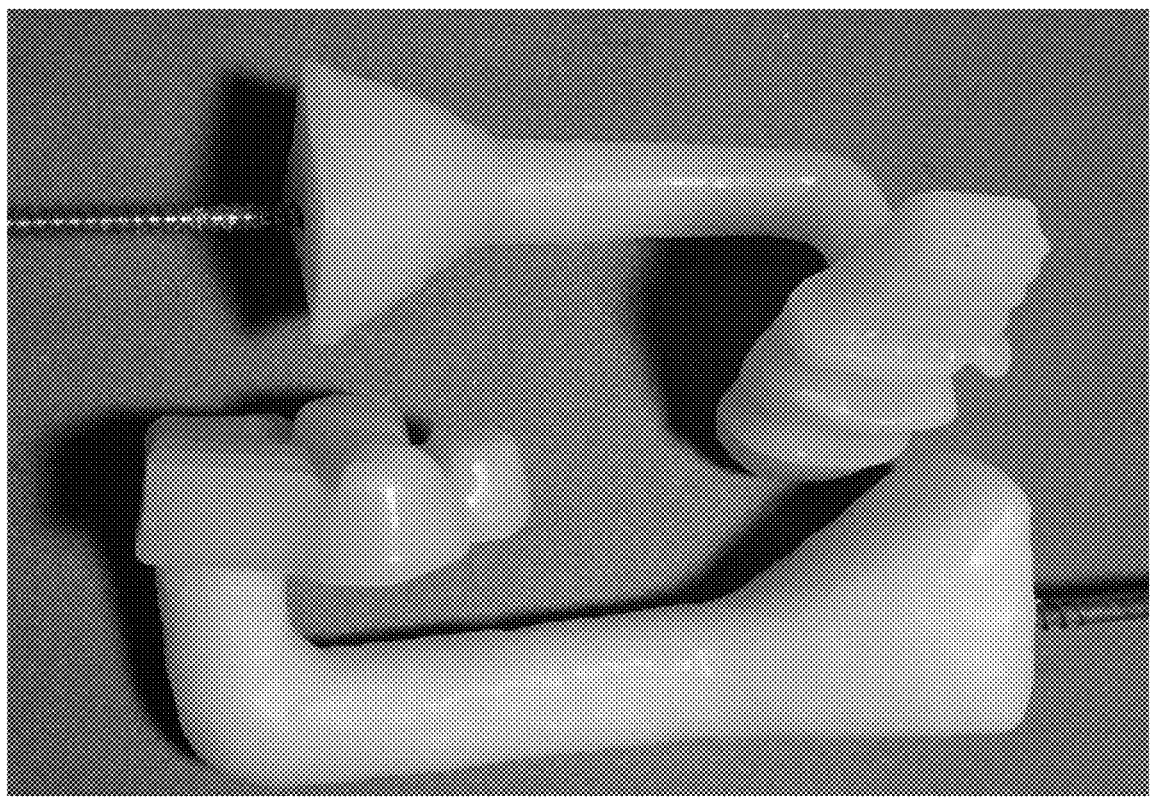
FIG. 3 is a typical wax pattern and wax assembly used to produce castings.

FIG. 3 depicts two typical pattern and wax assemblies 300 used to produce castings. Embodiments are made from, for example, wax, plastic, or other expendable material.

Figure 5:
FIG. 5 shows typical flash-fire-dewax and fired molds in accordance with an embodiment.

FIG. 4 depicts the dry powder formulations used to produce the molds shown in FIG. 5, having greatly reduced-silica, compared to colloidal silica. In FIG. 5 molds are shown produced from the formulations given in FIG. 4 with dry powder self-bonded refractory. The reduced silica in fired molds produced with self-bonded refractories, shown in FIG. 7, strongly suggests precision casting embodiments, by virtue of less reaction with the mold surface, have superior properties, lower cost of manufacture, and higher quality. FIG. 8, 820, clearly shows Ti 6Al 4V alloy in contact with colloidal silica bonded material picks up silicon, where it does not when in contact with a mold produced with reduced-silica self-bonded refractory, see FIG. 8, 840.

Embodiments provide refractory raw materials for investment casting slurries. Embodiments cover refractory raw material formulations, see FIG. 4, for prime and backup slurries. Embodiments of the product do not require aqueous colloidal silica sol for slurries used virtually throughout the industry today.

Embodiments comprise three powder components: 1) Nano-sized powder, 2) coarse refractory powder, and 3) organic polymer.

In embodiments, concentration of the Nano-sized powder is between 6.2% and 13.6% by dry weight. Particle size is less than 1 micron. For embodiments, the Nano-sized powder comprises fumed alumina, boehmite, fumed silica, or fumed titanium oxide or combinations thereof. The Nano-sized powder provides the required high temperature strength for the casting operation.

TABLE 1

Slurry Formula Examples, dry basis

| Slurry Name | 325 Tabular alumina | 200 or 120 Mesh Fused Silica | 200 Mesh Alumino-silicate | 5 325 Tab: 1 200 M FS | 3 200M Alumino: 1 120 M FS |
|---|---|---|---|---|---|
| Slurry Type | Prime | Backup | Backup | Prime | Backup |
| % 325 Tab. Alumina | 93.4-90.5 | | | 77.81 | |
| % 200 Mesh Fused Silica | | 90.6-85.6 | | 15.56 | |
| % 200 Mesh Aluminosilicate | | | 90.5-88.9 | | 65.29-64.9 |
| % 120 Mesh Fused Silica | | | | | 21.76-21.63 |
| % Boehmite | 7.7-6.0 | 12.8-6.9 | 9.9-7.4 | 4.67 | 11.16-9.19 |
| % Fumed Silica | 1.70-0.20 | 3.3-0.0 | 2.5-0.26 | 1.51 | 2.99-1.52 |
| % Fumed Titania | 0.07-0.04 | 0.14-0.07 | 0.10-0.05 | 0.06 | 0.13-0.06 |
| % Methylcellulose | 0.7-0.31 | 1.30-0.60 | 1.0-0.53 | 0.4 | 0.66-0.64 |
| wt. % Solids, balance deionized water | 78.2-72.6 | 70.91-63.1 | 71.6-68.4 | 64.8-64.4 | 78.6 |
| vol. % Solids | 47.4-42.5 | 51.96-42.8 | 46.6-43.4 | 41.0-40.3 | 51.4 |
| Specific Gravity, g/cc | 2.40-2.10 | 1.60-1.50 | 1.88-1.80 | 2.18-2.12 | 1.70-1.60 |
| pH, adjusted by dilute nitric acid | 4.0-5.0 | 4.0-5.0 | 4.0-5.0 | 4.0-5.0 | 4.0-5.0 |
| Viscosity, #4 Zahn Cup, sec. | 17.5-12.0 | 18.0-12.0 | 20.0-10.0 | 12.0-8.3 | 15.0-10.0 |

Eaxmple Table 2 Summary of Powder Formula Ranges

| | Maximum | Minimum |
|---|---|---|
| Coarse Refractory | 93.4% | 85.6% |
| Nano-particles | 13.6% | 6.23% |
| Organic Polymer | 1.34% | 0.31% |

Table 2 outlines the powder concentration ranges for slurry formula example embodiments. The coarse refractory component is between 85% and 93% by dry weight. For embodiments, the coarse refractory powder comprises milled zircon, tabular alumina or fused alumina, fused silica, alumino-silicate, zirconia, and yttria or combinations thereof.

In embodiments, the concentration of the organic polymer comprises between 0.3% and 1.3% of the total dry mass. In embodiments, the organic polymer provides the required slurry viscosity, sol viscosity, and mechanical strength associated with dipping, drying, and the mold dewax operation.

In embodiments, a small amount of wetting agent and anti-foam emulsion is used. A phosphate based wetting agent, Victawet 12, and Dow Corning antifoam 1430 and 1400 are used. Both (initially added to the water) were an asset to disperse the powders and reduce entrapped air. Dilute nitric acid was used to buffer the deionized water, between pH of 3.0 and 4.0, before preparing the slurry.

Table 3 lists embodiments for stucco and slurry combinations for the shell-build sequence used for molds #17, 18, 19, and 20.

TABLE 3

Mold Shell-build Details

| Coat # | Slurry | Stucco |
|---|---|---|
| 1 | 5:1 alumina: FS SB prime | 90 grit fused Alumina |
| 2 | 5:1 alumina: FS SB prime | 70 grit fused Alumina |
| 3 | 3:1 Al-silicate: FS | 60 grit Al-silicate |
| 4 | 3:1 Al-silicate: FS | 20-60 grit Al-silicate |
| 5 | 3:1 Al-silicate: FS | 20-60 grit Al-silicate |
| 6 | 3:1 Al-silicate: FS | 20-60 grit Al-silicate |
| 7 | 3:1 Al-silicate: FS | 20-60 grit Al-silicate |
| 8 | 3:1 Al-silicate: FS | Seal (no stucco) |

FIG. 4 is a table that illustrates formulations comparison distinctions 400 between embodiments of the invention and other methods. FIG. 4 shows that slurries with self-bonded refractories can be formulated with virtually the same coarse flour compositions, but, significantly, in place of colloidal silica, powdered boehmite, fumed silica, and fumed Titania are substituted. The powdered colloids produce an oxide composition of 71 wt. % $Al_2O_3$, 28 wt. % $SiO_2$, and 1 wt. % $TiO_2$.

Figure 7:
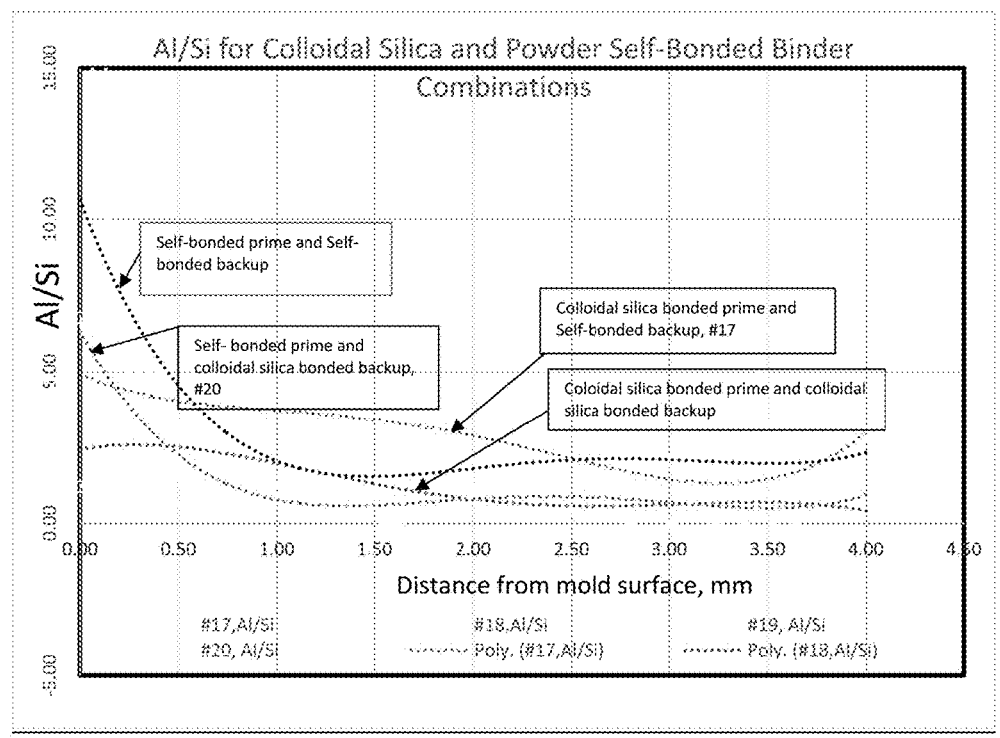
FIG. 7 is a graph depicting the ratio of aluminum-to-silicon for known colloidal silica bonded molds versus self-bonded refractory molds lacking colloidal silica in accordance with an embodiment.

FIG. 7 demonstrates Al/Si distinctions 700 between embodiments of the invention and other methods. FIG. 7 provides evidence that self-bonded refractories produce reduced silica molds. The ratio of aluminum-to-silicon (Al/Si) is reported representing the higher aluminum oxide of the binder and reduced silica by self-bonded refractories. As expected, the mold produced with all self-bonded refractories (#19) had the highest Al/Si ratio (10), least silica, and then progressively as less self-bonded refractory was used Al/Si reduced to the lowest value (2.5) for the control with all colloidal silica slurries. Also, note that the highest reduction of silica occurs at the mold surface where it is needed most where liquid metal contacts the mold.

Furthermore, regarding the casting of reactive aerospace alloys, the reduction of silica, for instance, to reduce reaction with titanium-based alloys has significant value. FIG. 8 shows the results for Titanium 6Al 4V alloy in contact with colloidal silica and self-bonded refractories. In FIG. 8, 820, silicon, not originally in the alloy, measures about 5% in the metal near the ceramic-metal interface. The latter is evidence of reaction by the metal with the colloidal silica from the mold material. Titanium was as low as 60% in the bulk metal, and as high as 20% on the ceramic side of the ceramic-metal interface. Less titanium in the bulk and more within the ceramic is evidence of reaction between the silica and the reactive titanium alloy.

With self-bonded refractory, FIG. 8, 840 shows no measurable silicon in the bulk metal. Increased silicon in the metal, evidence of a silica and titanium chemical reaction, did not occur. The latter shows that self-bonded refractory is less reactive, and provides significant advantage compared to colloidal-silica bonded materials.

Figure 6:
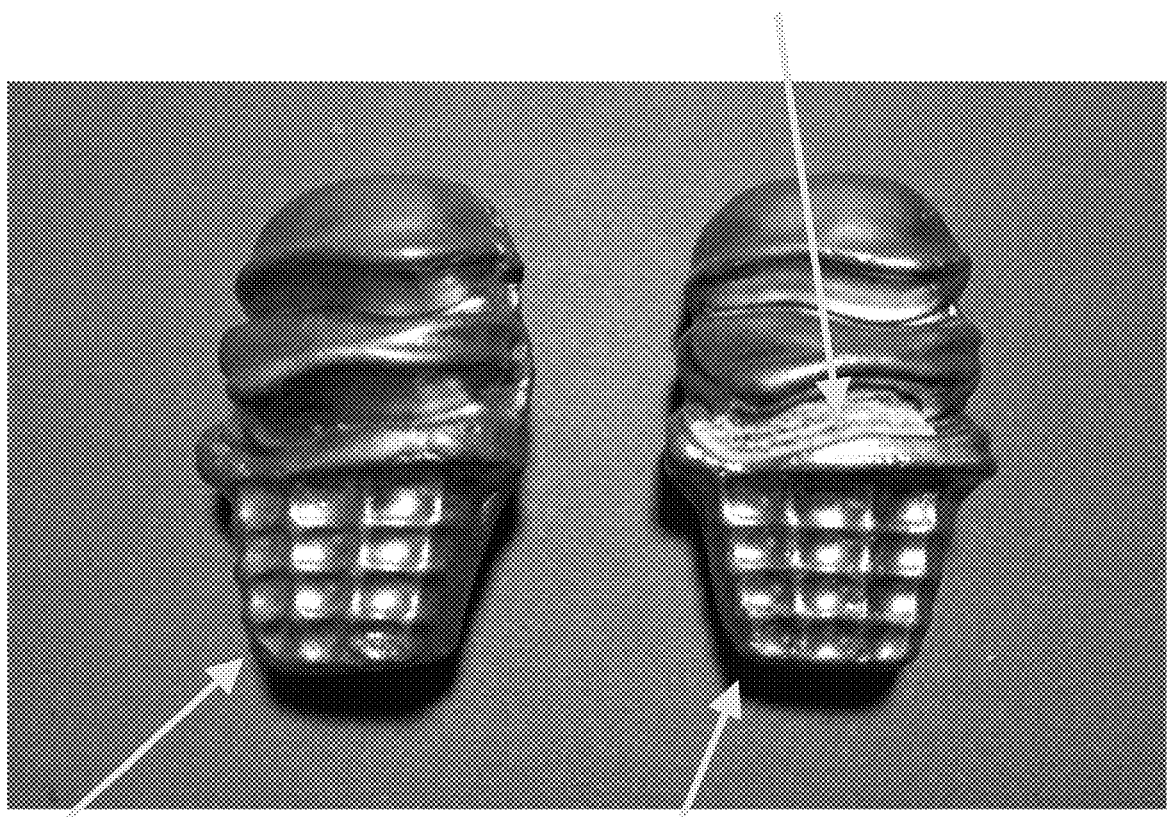
FIG. 6 shows castings made from ceramic molds in accordance with an embodiment.

Critical properties of investment casting molds include gas permeability, and strength. The gas permeability of the mold is extremely important for air-melt investment casting. Gas permeability only needs to be sufficient so the liquid metal can displace the gas inside the cavity created by the pattern. The castings 620, 640 in FIG. 6 show a complete casting, and is evidence that the permeability of the self-bonded prime refractory is sufficient and suitable for investment casting. Mold strength is critical so the mold does not crack during the dewax and/or casting operation. FIG. 5 shows evidence that self-bonded refractory as a prime or backup refractory has sufficient and suitable for investment casting. If the latter were not true there would be 'fins' on the casting where the liquid metal replicated cracks in the pattern cavity of the mold.

TABLE 4

Figure 9:
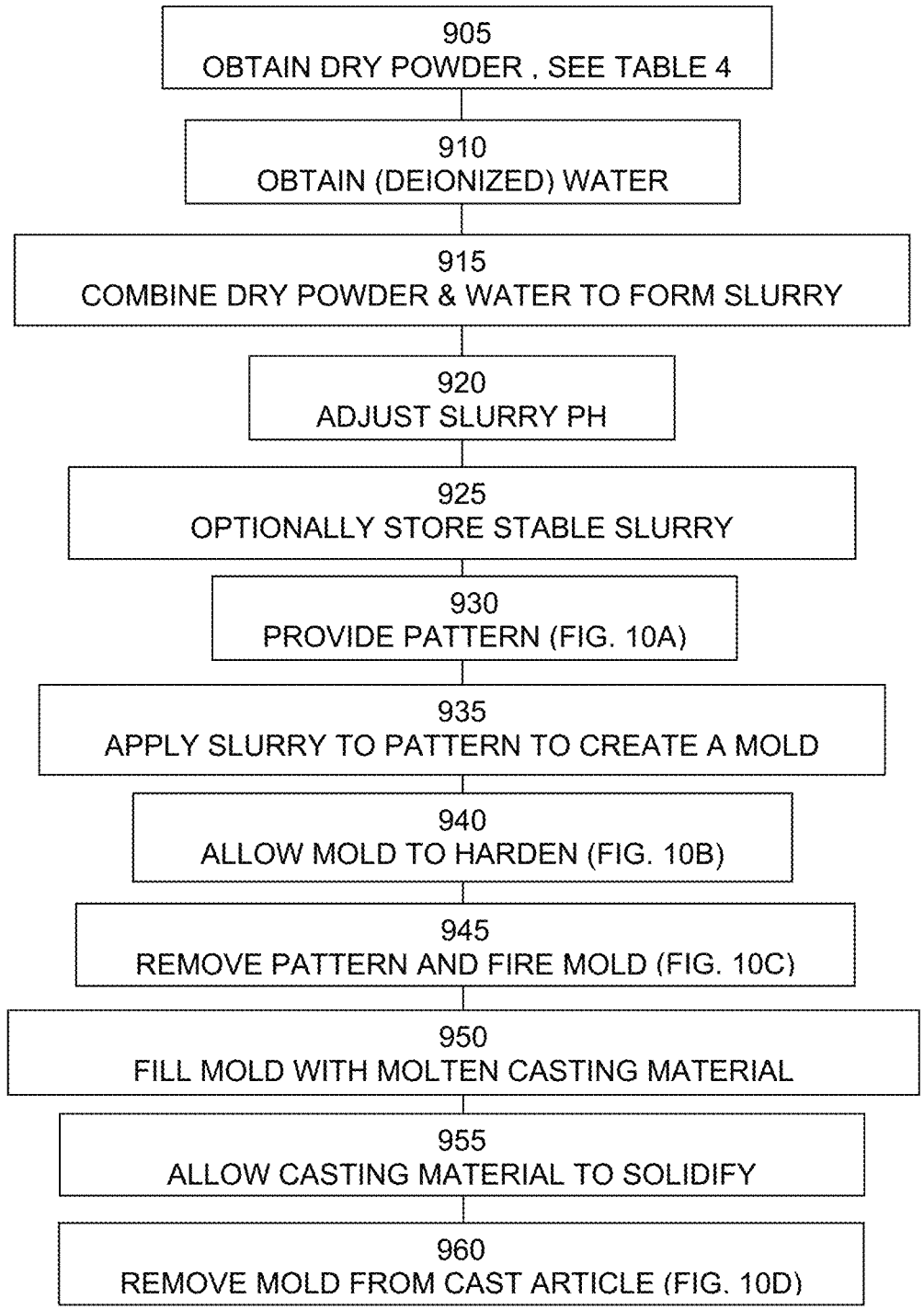
FIG. 9 depicts a flow chart of a method of an embodiment.

Powder Weight Percentages Supporting FIGS. 9 and 10

| Item # | Material | Wt. %'s for Prime | Wt. %'s for Backup |
|---|---|---|---|
| 1 | Boehmite | 7.7 | 8.2 |
| 2 | Fumed Silica | 1.1 | 2.7 |
| 3 | Fumed Titania | 0.05 | 0.1 |
| 4 | Methylcellulose | 0.7 | 1.3 |
| 5 | −325 Tabular Alumina | 90.5 | |
| 6 | −200 Fused Silica | | 22.0 |
| 7 | −200 Aluminosilicate | | 65.9 |
| 8 | Wt. % dry powder in slurry | 72.6 | 65.6 |
| 9 | Wt. % deionized water in slurry | 27.4 | 34.6 |

FIG. 9 is a flow chart 900 of the steps of a method for an embodiment of the invention. Steps comprise obtaining dry powders 905 combined in the weight percentages listed in Table 4 above. Obtaining (deionized) water and buffering it with dilute nitric acid 910. Combining dry powder and buffered water to form slurry 915. Embodiments use a propeller mixer and are electric or air-motor driven. Adjust slurry to have a pH range between 3.5 and 5.0 920. In embodiments, Nitric acid is the preferred chemical for adjusting the pH and for use in maintaining the pH in a narrow range. Store stable slurry 925. In embodiments, it is preferred to store the stable slurry in a mixer that keeps the slurry in motion. Provide/create pattern 930. For example, from wax, plastic, or other expendable material like FIG. 3 or FIG. 10, 1020. Apply slurry to pattern 935. Stucco composition to use for this invention comprises, but is not limited to, the ones listed in Table 3. Allow mold to harden 940, as shown in FIG. 10, 1040. Remove pattern from mold 945, for example by flash-fire dewax, like FIG. 5 and FIG. 10, 1060. Fill mold with molten casting material 950. Allow casting material to solidify 955. Remove mold from cast article 960, as shown in FIG. 6 and FIG. 10, 1080. The reduced silica in self-bonded refractory provides significant advantage.

Recapping, FIG. 8 shows SEM/EDS maps 800 comparing colloidal silica bonded prime and backup layers with a self-bonded prime layer and colloidal silica bonded backup layer in accordance with an embodiment. It clearly shows that self-bonded refractory produces reduced silica when used as prime or backup refractory. Furthermore, when used with reactive alloys such as Titanium alloys, FIG. 8, 820 shows particularly that when a Titanium 6Al 4V alloy is in contact with a silica-bonded mold, reaction leads to silicon contamination in the metal. However, when self-bonded refractory is used, see FIG. 8, 840, reaction and increased silicon contamination does not occur. The latter is just one example of how self-bonded refractory can make casting of other reactive elements, like yttrium, aluminum, or hafnium, much easier for casting manufacturers.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A self-bonding refractory powder product for use in making a slurry for investment casting molds comprising:
   a coarse refractory powder, wherein said coarse refractory powder comprises aluminum oxide, zircon, mullite, alumino-silicate, zirconium oxide, yttrium oxide, fused silicon oxide, and combinations thereof;
   a Nano-sized powder, wherein said Nano-sized powder comprises boehmite or pseudo boehmite, aluminum oxide, silicon oxide, or titanium oxide, and combinations thereof; and
   an organic polymer powder, wherein said organic polymer powder comprises a methylcellulose cellulose-based material.

2. The self-bonding refractory powder product of claim 1, wherein said organic polymer powder comprises:
   said cellulose-based material combined with polyethylene glycol.

3. The self-bonding refractory powder product of claim 1 wherein sizes of particles of said coarse refractory powder are −325 mesh, −200 mesh, and −120 mesh and combinations thereof.

4. The self-bonding refractory powder product of claim 1 wherein said Nano-sized powder component comprises particles less than about 300 nanometers.

5. The self-bonding refractory powder product of claim 1 wherein, when dispersed in deionized water, and buffered to between 3.0 and 5.0 pH, produces said slurry for investment casting molds to produce investment casting molds.

6. The self-bonding refractory powder product of claim 1, wherein, once used to produce said investment casting molds, yields investment casting molds that can be dewaxed by flash-fire or steam autoclave.

7. The self-bonding refractory powder product of claim 1, wherein it does not comprise aqueous colloidal silica to produce slurries used to build said investment casting molds.

8. A method for producing an investment casting comprising:
   obtaining a dry powder (905), wherein said dry powder comprises: fumed alumina, boehmite, fumed silica, or fumed titanium oxide or combinations thereof;
   aluminum oxide, zircon, mullite, alumino-silicate, zirconium oxide, yttrium oxide, silicon oxide, and combinations thereof; and
   a cellulose-based material, wherein said cellulose-based material comprises a methylcellulose cellulose-based material binder;
   obtaining water (910) and buffering said water;
   combining said dry powder and said buffered water to form a slurry (915);
   adjusting a pH of said slurry (920);
   providing a pattern (930);
   applying said slurry with a stucco to said pattern to create a mold (935);
   allowing said mold to harden (940);
   removing said pattern from said mold (945);
   filling said mold with molten casting material (950);
   allowing said casting material to solidify (955); and
   removing said mold from a cast article (960).

9. An investment casting mold obtained in a process comprising said powder refractory product of claim 1 and said method of claim 8.

10. The method for producing an investment casting of claim 8, wherein said step of obtaining water (910) and buffering said water comprises:
    adding nitric acid to achieve a pH of said water of between about 3.0 and about 5.0.

11. The method for producing an investment casting of claim 8, wherein said step of adjusting pH of said slurry (920) comprises:
    a slurry pH range of about 3.5 to about 5.0 (920).

12. The method for producing an investment casting of claim 8, further comprising a step of: storing said slurry (925).

13. The method for producing an investment casting of claim 12, wherein said step of storing said slurry (925) comprises:
    a viscosity in a range of 8 to 25 seconds measured with a #4 Zahn Cup.

14. The method for producing an investment casting of claim 8, wherein said step of removing said pattern from said mold comprises:
    flash-fire or steam autoclave (945).

15. A method for producing an investment casting comprising:
    obtaining a dry powder (905) comprising fumed alumina, boehmite, fumed silica, or fumed titanium oxide or combinations thereof, and aluminum oxide, zircon, mullite, alumino-silicate, zirconium oxide, yttrium oxide, silicon oxide, and combinations thereof, and a methylcellulose cellulose-based material;
    obtaining deionized water (910) and buffering said deionized water with nitric acid to a pH between about 3.0 and about 5.0;
    combining said dry powder and said buffered water to form a slurry (915);
    adjusting pH of said slurry as-needed to an about 3.5 to about 5.0 range (920);
    optionally storing said slurry (925) with viscosity in the range of 8 to 25 seconds measured with a #4 Zahn Cup;
    providing a pattern (930);
    applying said slurry with a stucco to said pattern to create a mold (935);
    allowing said mold to harden (940);
    removing said pattern from said mold by flash-fire or steam autoclave (945);
    filling said mold with molten casting material (950);
    allowing said casting material to solidify (955); and
    removing said mold from a cast article (960);
    wherein said methylcellulose cellulose-based material has a stress strain behavior comprising 5 to 15% elongation and a 174 deg. C. glass transition temperature.

* * * * *